(12) United States Patent
Paiement

(10) Patent No.: US 6,998,428 B1
(45) Date of Patent: Feb. 14, 2006

(54) GOLF TEE DEVICE AND METHODS

(76) Inventor: Michel Paiement, 3350 Cote Terrebonne, Terrebonne (CA) J6Y 1J2

( * ) Notice: Subject to any disclaimer, the term of this patent is extended or adjusted under 35 U.S.C. 154(b) by 0 days.

(21) Appl. No.: 10/439,795

(22) Filed: May 15, 2003

(51) Int. Cl.
*C08K 5/00* (2006.01)
*C08K 5/11* (2006.01)

(52) U.S. Cl. ................... 523/128; 523/124; 524/15
(58) Field of Classification Search ........... 473/132, 473/387; 428/423.1; 523/128, 124; 524/15
See application file for complete search history.

(56) References Cited

U.S. PATENT DOCUMENTS 4,014,541 A * 3/1977 Desmarais ............ 473/399
4,126,438 A * 11/1978 Pulli et al. ............ 504/101
5,040,792 A * 8/1991 Takigawa ............ 473/399

* cited by examiner

*Primary Examiner*—Thao Tran

(57) ABSTRACT

A golf tee device, an associated method of making the device and an associated method of using the device are disclosed. The golf tee device includes a water soluble nitrogen component, a water insoluble nitrogen component, a phosphate component, a potash component, and a support component. The method of making the device comprises the steps of coating, compressing, mixing, placing, and removing. The method of using the device comprises the steps of balancing, getting, hitting, holding, inserting, leaving, obtaining, positioning, returning, and swinging.

1 Claim, 1 Drawing Sheet

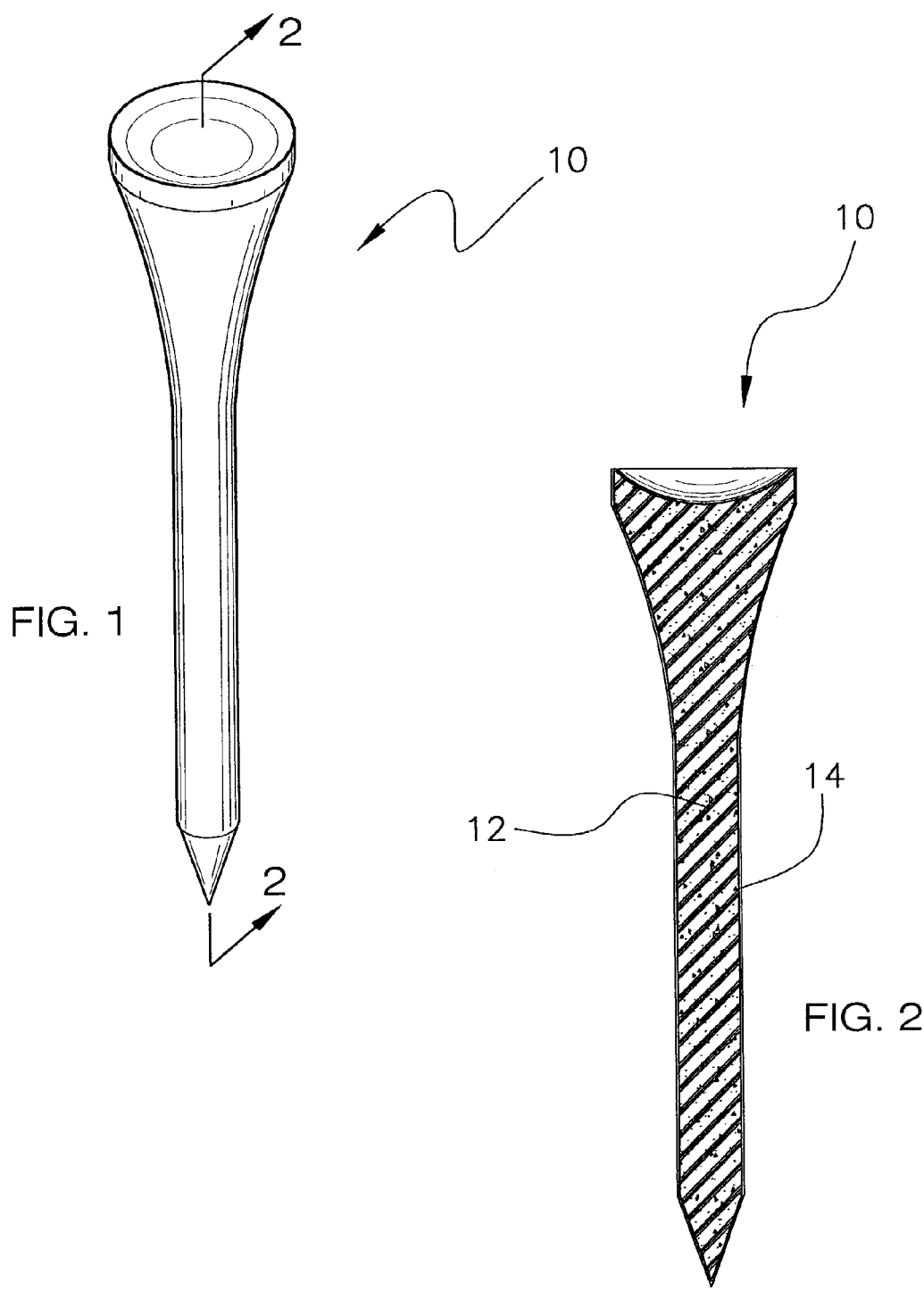

GOLF TEE DEVICE AND METHODS

FIELD OF THE INVENTION

The present invention relates to golf accessories, more particularly, to a golf tee device, a method of making and a method of using the golf tee device for use in the game of golf and for use in subsequently allowing the golf tee device to bio-degrade and fertilize a portion of the golf green.

DESCRIPTION OF THE PRIOR ART

Golf tees are conventionally made of wood or a moldable plastic. Tees made of such materials must be removed from the driving tee areas of golf courses, where they are often allowed to lie after the golfer has completed a drive. Tees of wood and plastic, when broken during the drive, are unsightly, are a hazard during mowing when struck by a mower blade and can damage the blades. The tees, being effectively water insoluble, must be physically picked up. Other products that are conventionally made of wood such as golf pencils and tongue depressors also present some disposal problems and thus requiring relatively short lifespans in the presence of moisture.

A wide variety of golf tee devices is currently available on the commercial market and an even larger number of these types of devices are known in the art of golf tee devices, for example, the golf tee disclosed by Desmarais in U.S. Pat. No. 4,014,541; the novel golf tee disclosed by Pulli et al. in U.S. Pat. No. 4,126,438; the golf tees disclosed by Noland and Fransham in U.S. Pat. No. 4,909,508; the golf tee disclosed by Golden et al. in U.S. Pat. No. 5,046,730; the moldable composition of matter disclosed by Golden in U.S. Pat. No. 5,317,037; the soluble plant food containing micronutrients disclosed by Beaty in U.S. Pat. No. 5,634,959; and the biodegradable golf tee disclosed by Alexsen in U.S. Pat. No. 6,319,156.

While all of the above-described devices fulfill their respective, particular objectives and requirements, the aforementioned patents do not describe a golf tee device having a water soluble nitrogen component, a water insoluble nitrogen component, a phosphate component, a potash component, and a support component. This combination of elements would specifically match the user's particular individual needs of making it possible to allow the device to bio-degrade after using the device so that the device may subsequently fertilize a portion of a golf green. The above-described patents make no provision for a golf tee device having a water soluble nitrogen component, a water insoluble nitrogen component, a phosphate component, a potash component, and a support component.

Therefore, a need exists for a new and improved golf tee device having a water-soluble nitrogen component, a water insoluble nitrogen component, a phosphate component, a potash component, and a support component. In this respect, the golf tee device according to the present invention substantially departs from the conventional concepts and designs of the prior art, and in doing so provides an apparatus primarily developed for the purpose of providing a means for fertilizing a portion of a golf green subsequent to using the device in the game of golf.

SUMMARY OF THE INVENTION

The present device, method of making and method of using, according to the principles of the present invention, overcomes the shortcomings of the prior art by providing a golf tee device, method of making and method of using for use in allowing the device to bio-degrade while fertilizing a portion of a golf green. The golf tee device includes a water soluble nitrogen component, a water insoluble nitrogen component, a phosphate component, a potash component, and a support component. The method of making the device comprises the steps of coating, compressing, mixing, placing, and removing. The method of using the device comprises the steps of balancing, getting, hitting, holding, inserting, leaving, obtaining, positioning, returning, and swinging.

In view of the foregoing disadvantages inherent in the known type golf tee devices now present in the prior art, the present invention provides an improved golf tee device, which will be described subsequently in great detail, is to provide a new and improved golf tee device which is not anticipated, rendered obvious, suggested, or even implied by the prior art, either alone or in any combination thereof.

To attain this, the present invention essentially comprises a water soluble nitrogen component, a water insoluble nitrogen component, a phosphate component, a potash component, and a support component.

There has thus been outlined, rather broadly, the more important features of the invention in order that the detailed description thereof that follows may be better understood, and in order that the present contribution of the art may be better appreciated.

The invention may also include a polymeric coating component for enshrouding the device. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved golf tee device that has all the advantages of the prior art golf tee device and none of the disadvantages.

It is another object of the present invention to provide a new and improved golf tee device that may be easily and efficiently manufactured and marketed.

An even further object of the present invention is to provide a new and improved golf tee device that has a low cost of manufacture with regard to both materials and labor, and which accordingly is then susceptible of low prices of sale to the consuming public, thereby making such multi-purpose storage unit and system economically available to the buying public.

Still another object of the present invention is to provide a new golf tee device that provides in the apparatuses and methods of the prior art some of the advantages thererof, while simultaneously overcoming some of the disadvantages normally associated therewith.

Even still another object of the present invention is to provide a golf tee device having a water soluble nitrogen component, a water insoluble nitrogen component, a phosphate component, a potash component, and a support component. This combination of elements makes it possible to allow the device to bio-degrade after using the device so that the device may subsequently fertilize a portion of a golf green.

Still another object of the present invention is to provide a method of making the device comprising the steps of coating, compressing, mixing, placing, and removing.

Lastly, it is an object of the present invention to provide a new and improved method of using comprising the steps balancing, getting, hitting, holding, inserting, leaving, obtaining, positioning, returning, and swinging.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of an preferred embodiment of the golf tee device constructed in accordance with the principles of the present invention; and FIG. 2 is a cross sectional side view of a preferred embodiment of the golf tee device of the present invention.

The same reference numerals refer to the same parts throughout the various figures.

DETAILED DESCRIPTION OF THE PREFERRED EMBODIMENT

Referring now to the drawings, and in particular FIG. 1 thereof, one preferred embodiment of the present invention is shown and generally designated by the reference numeral 10. One preferred embodiment of a golf tee device 10 comprises: a water soluble nitrogen component, a water insoluble nitrogen component, a phosphate component, a potash component, and a support component. The water soluble nitrogen component is in an amount from about 0.1% w/w to about 20% w/w. The water insoluble nitrogen component is in an amount from about 0.1% w/w to about 20% w/w. The phosphate component is in an amount from about 0.1% w/w to about 20% w/w. The potash component is in an amount from about 0.1% w/w to about 20% w/w. The support component is in an amount from about 20% w/w to about 99% w/w. A more preferred embodiment of the device 10 comprises the water soluble nitrogen component is in an amount from about 1% w/w to about 10% w/w; the water insoluble nitrogen component is in an amount from about 1% w/w to about 10% w/w; the phosphate component is in an amount from about 1% w/w to about 10% w/w; the potash component is in an amount from about 1% w/w to about 10% w/w; and the support component is in an amount from about 40% w/w to about 95% w/w. A most preferred embodiment of the device 10 comprises the water soluble nitrogen component is in an amount from about 5% w/w; the water insoluble nitrogen component is in an amount from about 10% w/w; the phosphate component is in an amount from about 5% w/w; the potash component is in an amount from about 5% w/w; and the support component is in an amount from about 75% w/w.

Another preferred embodiment of the golf tee device 10 consists essentially of a water soluble nitrogen component, a water insoluble nitrogen component, a phosphate component, a potash component, and a support component.

An optional polymeric coating component 14 may be added to the device 10. The polymeric coating component 14 may be in an amount from about 0.01% w/w to about 1% w/w, in which the polymeric coating component 14 is selected from the group consisting of polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

An optional pH modifier component may be added to the device 10 in which the pH modifier component is in an amount from about 0.1% w/w to about 30% w/w. The pH modifier component may be selected from the group consisting of calcium carbonate, magnesium carbonate, elemental sulfur, calcium oxide, dolomite, and lime.

An optional binder may be added to the device 10 in which the binder is in an amount from about 0.01% w/w to about 5% w/w. The binder may comprise dextrose, fructose, sucrose, gum arabic, and admixtures thereof.

The water insoluble nitrogen component may be any commercially available water insoluble nitrogen component wherein some preferred water insoluble nitrogen components may be selected from the group consisting of urea-formaldehyde, isobutylidene diurea, magnesium ammonium phosphate, methylene urea, sewage sludge, sulfur coated urea, seed meals, and dried blood.

The phosphate component may be any commercially available phosphate component, wherein some preferred phosphate components may be selected from the group consisting of phosphoric acid, monobasic sodium phosphate, dibasic sodium phosphate, tribasic sodium phosphate, monobasic potassium phosphate, dibasic potassium phosphate, tribasic potassium phosphate, and dibasic phosphate citrate.

The water soluble nitrogen component may be any commercially available water soluble nitrogen component wherein some preferred water soluble nitrogen components may be selected from the group consisting of ammonium nitrate, ammonium sulfate, diammonium citrate, cobaltous ammonium sulfate, ammonium nitrate, diammonium hydrogen phosphate, ammonium diphosphate, ammonium oxalate, ammonium sulfate, potassium nitrate, sodium nitrate, and urea.

The potash component may be any commercially available potash component, wherein some preferred potash components may be selected from potash, potassium nitrate, monobasic potassium phosphate, dibasic potassium phosphate, tribasic potassium phosphate.

The support component may be any commercially available support component, wherein some preferred support components may be selected from the group consisting of sand, clay, sawdust, and a zeolite. Some preferred zeolites may be selected from the group consisting of clinoptilolite, heulandite, Analcime, Wairakite, Pollucite, Sodalite, Faujasite, Chabazite, Gmelinite, Erionite, Offretite, Levynite, Natrolite, Scolecite, Mesolite, Edintonite, Thomsonite, Gonnardite, Phillipsite, Harmontome, Gismondine, Garronite, Mordenite, Diachiardite, and Stilbite.

One preferred embodiment of a method of making a golf tee device 10 comprising the steps of: coating, compressing, mixing, placing, and removing. The mixing step comprises mixing together a water soluble nitrogen component, a water insoluble nitrogen component, a phosphate component, a phosphate component, and a support component to form a slurry, wherein the water soluble nitrogen component is in an amount from about 0.1% w/w to about 20% w/w, the water insoluble nitrogen component is in an amount from about 0.1% w/w to about 20% w/w; a phosphate component is in an amount from about 0.1% w/w to about 20% w/w, a potash component is in an amount from about 0.1% w/w to about 20% w/w, and a support component is in an amount from about 20% w/w to about 99% w/w. The placing step comprises placing an aliquot of the slurry into a mold. The compressing step comprises compressing the aliquot of the slurry in the mold to form a core 12. The removing step comprises removing the core 12 from the mold. The coating step comprises coating the core 12 with a polymeric coating component 14 in an amount from about 0.01% w/w to about 1% w/w.

Another preferred embodiment of the method of making a golf tee device 10 consists essentially of the steps of: coating, compressing, mixing, placing, and removing.

One preferred embodiment of a method of making a golf tee device 10 comprises the steps of: balancing, getting, hitting, holding, inserting, leaving, obtaining, positioning, returning, and swinging. The obtaining step comprises obtaining the golf tee device comprising: a water soluble nitrogen component in an amount from about 0.1% w/w to about 20% w/w; a water insoluble nitrogen component in an amount from about 0.1% w/w to about 20% w/w; a phosphate component in an amount from about 0.1% w/w to about 20% w/w; a potash component in an amount from about 0.1% w/w to about 20% w/w; and a support component in an amount from about 20% w/w to about 99% w/w. The inserting step comprises inserting a first end of the golf tee device 10 into a golf green. The balancing step comprises balancing a golf ball a second end of the device 10 when the first end of the device 10 is inserted in the golf green. The getting step comprises getting a golf club from a golf bag. The holding step comprises holding the golf club with both hands. The positioning step comprises positioning oneself near the golf ball balanced on the second end of the device 10. The swinging step comprises swinging at the golf ball balanced on the second end of the device 10 while holding the golf club and while being poitioned near the golf ball. The hitting step comprises hitting the golf ball with the golf club subsequent to said swinging step. The leaving step comprises leaving the device 10 in the golf green subsequent to said hitting step. The returning step comprises returning the golf club back into the golf bag.

Another preferred embodiment of the method of making a golf tee device 10 consists essentially of the steps of: balancing, getting, hitting, holding, inserting, leaving, obtaining, positioning, returning, and swinging.

Refer now to FIG. 2, which depicts a cross sectional side view of a preferred embodiment of the golf tee device 10 showing the core 12 enshrouded by a polymeric coating component 14.

As to the manner of usage and operation of the present invention, the same should be apparent from the above description. Accordingly, no further discussion relating to the manner of usage and operation will be provided.

While a preferred embodiment of the golf tee device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A golf tee device comprising:

a water soluble nitrogen component in an amount from about 0.1% w/w to about 20% w/w;

a water insoluble nitrogen component in an amount from about 0.1% w/w to about 20% w/w;

a phosphate component in an amount from about 0.1% w/w to about 20% w/w;

a potash component in an amount from about 0.1% w/w to about 20% w/w;

a support component in an amount from about 20% w/w to about 99% w/w; and a pH modifier component in an amount from about 0.1% w/w to about 30% w/w wherein said pH modifier component is selected from the group consisting of calcium oxide, dolomite, elemental sulfur and mixtures thereof.

* * * * *